No. 779,585. PATENTED JAN. 10, 1905.
F. C. CANNON.
TUBULAR LANTERN.
APPLICATION FILED JUNE 27, 1904.

No. 779,585.                                              Patented January 10, 1905.

UNITED STATES PATENT OFFICE.

FREDERIC C. CANNON, OF NEW HAVEN, CONNECTICUT, ASSIGNOR TO THE C. COWLES & CO., OF NEW HAVEN, CONNECTICUT, A CORPORATION.

TUBULAR LANTERN.

SPECIFICATION forming part of Letters Patent No. 779,585, dated January 10, 1905.

Application filed June 27, 1904. Serial No. 214,232.

*To all whom it may concern:*

Be it known that I, FREDERIC C. CANNON, of New Haven, in the county of New Haven and State of Connecticut, have invented a new and useful Improvement in Tubular Lanterns; and I do hereby declare the following, when taken in connection with the accompanying drawings, and the numerals of reference marked thereon, to be a full, clear, and exact description of the same, and which said drawings constitute part of this specification, and represent, in—

Figure 1:
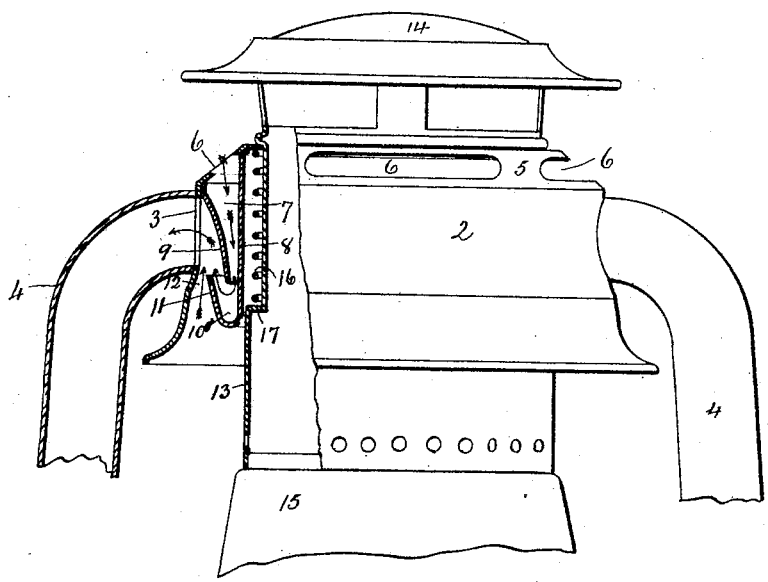
Figure 2:
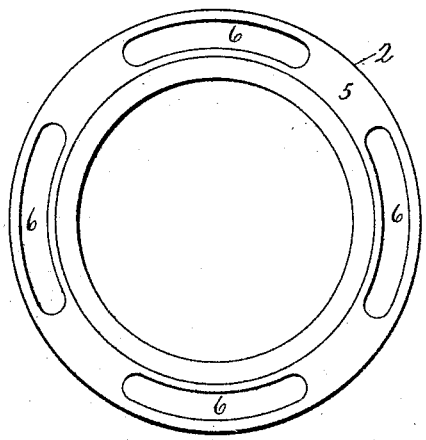

Figure 1, a broken view, partly in elevation and partly in vertical section, of the upper portion of a tubular lantern constructed in accordance with my invention; Fig. 2, a detached plan view of the bell.

My invention relates to an improvement in that class of lanterns known in the art and to the trade as "tubular" lanterns, for the reason that they are provided with tubes through which air for the support of the flame is conducted downward to the burner from the upper part of the lantern, the object of my present invention being to provide a simple, compact, reliable, and effective construction whereby a constant and even downward flow of air through the tubes will be maintained against disturbance or reversal due to swinging the lantern or suddenly moving it upward or downward or exposing it to the action of strong air-currents moving either upward or downward.

With these ends in view my invention consists in certain details of construction and combinations of parts, as will be hereinafter described, and pointed out in the claims.

In carrying out my invention as herein shown I provide the lantern with a downwardly-opening bell 2, formed at opposite points in its sides with lateral air-outlet openings 3, through which air enters the upper ends of the tubes 4, which are attached to the bell so as to register with the said openings 3. The upper portion of the said bell has a sloping surface 5, formed with four more or less segmental air-inlet openings 6, through which air passes downward into an annular air-chamber 7, formed within the bell by the bell itself and by a frame-ring 8, arranged concentrically within it and having its upper edge secured to it near its top. Within the air-chamber 7 I locate a baffle-ring 9, which, as shown, is cone-shaped. This baffle-ring 9 has its larger upper end secured to the bell near the top thereof and extends inwardly and downwardly in the annular air-chamber 7, which it divides diagonally into outer and inner portions substantially corresponding in size, but reversed end for end in position. At its extreme lower end the said baffle-ring extends downward into a trough-like guard-chamber 10, formed by turning the lower edge of the frame-ring 8 upwardly to form an outwardly-inclined baffle-flange 11, which closes the lower end of the outer portion of the air-chamber 7, except for a narrow throat 12, opening downward into the lower portion of the bell 2.

It will be readily understood that in case the lantern is swung by its bail or suddenly raised—as, for instance, in signaling—all of the air thus rapidly taken into it through the segmental air-inlet openings 6 must pass downwardly through the contracted inner portion of the chamber 7 and into the inner portion of the guard-chamber 10, in which it will be deflected around the lower edge of the baffle-ring 9 into the outer portion of the said chamber 10, from which it will rise into the outer portion of the air-chamber 7, from which it will pass outward through the lateral openings 3 in the bell into the upper ends of the tubes 4. On the other hand, if the lantern is suddenly lowered or exposed to strong upward currents the air will enter the bell from beneath and be so retarded in its passage through the narrow throat 12 into the outer portion of the air-chamber 7 that it will be nullified in its effect upon the normal currents of air passing downward through the tubes 4.

The other details of the lantern may be of any approved construction and are not shown beyond the vertically-movable metal chimney or sleeve 13, which is located in the bell and formed at its upper end with a short top plate or dome 14 and adapted at its lower end to receive the upper end of the globe 15, which the chimney 13 is normally held down upon by means of a spring 16, the upper end of which impinges against the top of the bell and the lower end of which bears upon a shoulder 17, formed upon the outside of the chimney 13 a trifle below the center thereof.

It is apparent that in carrying out my invention some changes from the construction herein shown and described may be made. I would therefore have it understood that I do not limit myself thereto, but hold myself at liberty to make such variations therein as fairly fall within the spirit and scope of my invention.

Having fully described my invention, what I claim as new, and desire to secure by Letters Patent, is—

1. In a tubular lantern, the combination with a downwardly-opening bell formed in its top with air-inlet openings and in its sides with air-outlet openings, of tubes having their upper ends secured to the said bell and registering with the said air-outlet openings, a ring located within the bell and forming in conjunction therewith an annular air-chamber, a baffle-ring extending downwardly in the said air-chamber which it divides into an inner and an outer portion, a guard-chamber into which the lower end of the said baffle-ring enters, and a baffle-flange forming a narrow throat for the entrance of air from the bottom of the bell into the lower end of the outer portion of the said air-chamber.

2. In a tubular lantern, the combination with a downwardly-opening bell formed in its top with air-inlet openings, and in its sides with air-outlet openings, of tubes having their upper ends secured to the said bell and registering with the said air-outlet openings, a ring located within the bell and forming in conjunction therewith an annular air-chamber, a cone-shaped baffle-ring extending inwardly and downwardly diagonally across the said air-chamber which it divides into an inner and an outer portion, a guard-chamber into which the lower end of the said cone enters, and a baffle-flange forming a narrow throat for the entrance of air from the bottom of the bell into the lower end of the outer portion of the said air-chamber.

3. In a tubular lantern, the combination with a downwardly-opening bell formed in its top with air-inlet openings and in its sides with air-outlet openings, of tubes having their upper ends secured to the said bell and registering with the said air-outlet openings, a ring located within the bell, forming in conjunction therewith an annular air-chamber and having its lower end turned upwardly to form a guard-chamber and a baffle-flange, and a baffle-ring extending downwardly in the said air-chamber which it divides into an inner and an outer portion and extending into the said guard-chamber formed by the said baffle-flange which forms a narrow throat for the entrance of air from the bottom of the bell into the lower end of the outer portion of the said air-chamber.

In testimony whereof I have signed this specification in the presence of two subscribing witnesses.

FRED. C. CANNON.

Witnesses:
CLARA L. WEED,
GEORGE D. SEYMOUR.